US011456868B2

(12) United States Patent
Bergner et al.

(10) Patent No.: US 11,456,868 B2
(45) Date of Patent: *Sep. 27, 2022

(54) METHOD AND SYSTEM FOR RECORDING POINT TO POINT TRANSACTION PROCESSING

(71) Applicant: MASTERCARD INTERNATIONAL INCORPORATED, Purchase, NY (US)

(72) Inventors: Rebecca Ann Bergner, Ballwin, MO (US); Anthony Paul Murphy, Singapore (SG); Richard David D'Erizans, Pleasantville, NY (US); Gopinatha Joshi, Chesterfield, MO (US); Carl D. Jansson, St. Charles, MO (US); Maria Rice, Davie, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/842,886

(22) Filed: Apr. 8, 2020

(65) Prior Publication Data

US 2020/0235928 A1     Jul. 23, 2020

Related U.S. Application Data

(63) Continuation of application No. 15/914,398, filed on Mar. 7, 2018, now Pat. No. 10,659,227.

(Continued)

(51) Int. Cl.
*H04L 9/32* (2006.01)
*H04L 9/30* (2006.01)
(Continued)

(52) U.S. Cl.
CPC ........... *H04L 9/30* (2013.01); *G06Q 20/3825* (2013.01); *G06Q 20/3829* (2013.01);
(Continued)

(58) Field of Classification Search
CPC ........... H04L 9/30; H04L 9/14; H04L 9/0637; G06Q 20/3825; G06Q 20/3829; G06Q 30/0635
(Continued)

(56) References Cited

U.S. PATENT DOCUMENTS

| 8,719,952 B1 | 5/2014 | Damm-Goossens |
| 8,898,759 B2 | 11/2014 | Schultz et al. |

(Continued)

FOREIGN PATENT DOCUMENTS

| CN | 104052605 A | 9/2014 |
| CN | 104158816 A | 11/2014 |

(Continued)

OTHER PUBLICATIONS

Office Action (First Examination Report) dated Jun. 2, 2021, by the Patent Office, Government of India, in corresponding India Patent Application No. 201917034981 with an English Translation of the Office Action. (5 pages).

(Continued)

*Primary Examiner* — Monjur Rahim
(74) *Attorney, Agent, or Firm* — Panitch Schwarze Belisario & Nadel LLP

(57) ABSTRACT

A method for providing a multi-service platform to entities includes the storage of profiles for a plurality of entities involved in services with other entities, including point to point and business to business transactions, including entities not registered, that can be claimed by each entity, where each entity can provide for roles and hierarchies of authorized users of the platform for that entity, and where the platform is configured to provide, among other services, registration of procurement status for purchase orders in a digital ledger that provides for auditability and immutability.

16 Claims, 9 Drawing Sheets

Related U.S. Application Data

(60) Provisional application No. 62/467,900, filed on Mar. 7, 2017.

(51) Int. Cl.
*H04L 9/40* (2022.01)
*H04L 9/06* (2006.01)
*H04L 9/08* (2006.01)
*H04L 9/14* (2006.01)
*G06Q 30/06* (2012.01)
*G06Q 20/38* (2012.01)

(52) U.S. Cl.
CPC ..... *G06Q 30/0633* (2013.01); *G06Q 30/0635* (2013.01); *H04L 9/0637* (2013.01); *H04L 9/0861* (2013.01); *H04L 9/0866* (2013.01); *H04L 9/14* (2013.01); *H04L 9/3242* (2013.01); *H04L 9/3247* (2013.01); *H04L 63/0428* (2013.01); *H04L 63/08* (2013.01); *H04L 63/0876* (2013.01); *G06Q 2220/00* (2013.01)

(58) Field of Classification Search
USPC ........................................................ 713/171
See application file for complete search history.

(56) References Cited

U.S. PATENT DOCUMENTS

| | | | |
|---|---|---|---|
| 10,158,480 | B1 | 12/2018 | Winklevoss et al. |
| 2001/0032310 | A1 | 10/2001 | Corella |
| 2001/0054153 | A1 | 12/2001 | Wheeler et al. |
| 2013/0339141 | A1 | 12/2013 | Stibel et al. |
| 2014/0123247 | A1 | 5/2014 | Abhyanker |
| 2014/0295956 | A1 | 10/2014 | Katz et al. |
| 2014/0310779 | A1 | 10/2014 | Lof et al. |
| 2015/0026062 | A1 | 1/2015 | Paulsen et al. |
| 2015/0052594 | A1 | 2/2015 | Liberman et al. |
| 2015/0269692 | A1 | 9/2015 | Ryan |
| 2015/0288694 | A1* | 10/2015 | Liebl, III .............. H04L 9/3247 713/182 |
| 2015/0310424 | A1* | 10/2015 | Myers ................... H04L 9/3239 705/69 |
| 2016/0042327 | A1 | 2/2016 | Messina et al. |
| 2016/0055322 | A1* | 2/2016 | Thomas .............. H04L 63/0876 726/7 |
| 2016/0086175 | A1* | 3/2016 | Finlow-Bates .... G06Q 20/3825 705/77 |
| 2016/0119143 | A1 | 4/2016 | Fang et al. |
| 2016/0234026 | A1* | 8/2016 | Wilkins ................... G06F 21/64 |
| 2016/0260169 | A1 | 9/2016 | Arnold et al. |
| 2016/0300234 | A1* | 10/2016 | Moss-Pultz ............. G06F 21/10 |
| 2016/0350749 | A1 | 12/2016 | Wilkins et al. |
| 2017/0011460 | A1* | 1/2017 | Molinari ............. H04L 63/0823 |
| 2017/0012943 | A1 | 1/2017 | Kaliski, Jr. et al. |
| 2017/0017936 | A1* | 1/2017 | Bisikalo ............... G06Q 20/308 |
| 2017/0017954 | A1* | 1/2017 | McDonough ......... H04L 9/3239 |
| 2017/0017955 | A1* | 1/2017 | Stern ...................... G06F 21/645 |
| 2017/0046689 | A1* | 2/2017 | Lohe ....................... G06Q 20/40 |
| 2017/0091756 | A1* | 3/2017 | Stern ...................... G06F 16/951 |
| 2017/0270493 | A1 | 9/2017 | Lugli et al. |
| 2018/0240112 | A1 | 8/2018 | Castinado et al. |
| 2018/0260811 | A1 | 9/2018 | Bergner et al. |
| 2018/0260879 | A1 | 9/2018 | Bergner et al. |
| 2018/0374097 | A1 | 12/2018 | Hanna |
| 2019/0026685 | A1* | 1/2019 | Chappell ............. G06Q 30/0282 |
| 2019/0057362 | A1* | 2/2019 | Wright ................. G06F 16/1834 |
| 2019/0057382 | A1 | 2/2019 | Wright et al. |
| 2020/0065761 | A1 | 2/2020 | Tatchell |

FOREIGN PATENT DOCUMENTS

| | | | |
|---|---|---|---|
| CN | 105373955 | A | 3/2016 |
| CN | 105809062 | A | 7/2016 |
| CN | 105976232 | A | 9/2016 |
| CN | 106161710 | A | 11/2016 |
| WO | 0033271 | A2 | 6/2000 |
| WO | 02086779 | A1 | 10/2002 |
| WO | 2015183901 | A2 | 12/2015 |
| WO | 2016/028606 | A1 | 2/2016 |
| WO | 2016186869 | A1 | 11/2016 |

OTHER PUBLICATIONS

Office Action (Notification of Second Office Action) dated Feb. 8, 2022, by the China National Intellectual Property Administration in corresponding Chinese Patent Application No. 201880016307.7 and an English Translation of the Office Action. (13 pages).

Final Office Action issued by the U.S. Patent and Trademark Office in the U.S. Appl. No. 15/914,326, dated Oct. 4, 2021, U.S. Patent and Trademark Office, Alexandria, VA. (15 pages).

Office Action (Notification of the First Office Action) dated Jul. 30, 2021, by the China National Intellectual Property Administration in corresponding Chinese Patent Application No. 201880016304.3 and an English Translation of the Office Action. (13 pages).

Office Action (Notification of the First Office Action) dated Aug. 2, 2021, by the China National Intellectual Property Administration in corresponding Chinese Patent Application No. 201880016307.7 and an English Translation of the Office Action. (16 pages).

Office Action (Communication pursuant to Article 94(3) EPC) dated Feb. 12, 2021, by the European Patent Office in corresponding European Patent Application No. 18 712 764.2-1213. (8 pages).

Non-Final Office Action issued by the U.S. Patent and Trademark Office in the U.S. Appl. No. 15/914,326, dated Jun. 11, 2021, U.S. Patent and Trademark Office, Alexandria, VA. (14 pages).

Office Action (First Examination Report) dated Mar. 2, 2021, by the Patent Office, Government of India, in corresponding India Patent Application No. 201917034980 with an English Translation of the Office Action. (7 pages).

Notification of Transmittal of the International Search Report and the Written Opinion of the International Searching Authority (Forms PCT/ISA/220, PCT/ISA/210 and PCT/ISA/237) dated Jun. 15, 2018, by the European Patent Office in the International Application No. PCT/US2018/021272. (12 pages).

Notification of Transmittal of the International Search Report and the Written Opinion of the International Searching Authority (Forms PCT/ISA/220, PCT/ISA/210 and PCT/ISA/237) dated Jul. 10, 2018, by the European Patent Office in the International Application No. PCT/US2018/021279. (12 pages).

Notification of Transmittal of the International Search Report and the Written Opinion of the International Searching Authority (Forms PCT/ISA/220, PCT/ISA/210 and PCT/ISA/237) dated Jun. 15, 2018, by the European Patent Office in corresponding International Application No. PCT/US2018/021276. (12 pages).

Non-Final Office Action issued by the U.S. Patent and Trademark Office in the U.S. Appl. No. 15/914,326, dated Nov. 19, 2019, U.S. Patent and Trademark Office, Alexandria, VA. (15 pages).

Fromknecht et al., "A Decentralized Public Key Infrastructure with Identity Retention," Nov. 11, 2014, XP055572023, Retrieved from the Internet <URL:https://eprint.iacr.org/2014/803.pdf> [retrieved on Feb. 25, 2021] (Year: 2014), pp. 1-16.

Final Office Action issued by the U.S. Patent and Trademark Office in the U.S. Appl. No. 15/914,461, dated Mar. 8, 2021, U.S. Patent and Trademark Office, Alexandria, VA. (35 pages).

Office Action (Communication pursuant to Article 94(3) EPC) dated Feb. 25, 2021, by the European Patent Office in corresponding European Patent Application No. 18 713 487.9-1213. (9 pages).

Office Action (Notification of Second Office Action) dated Jan. 13, 2022, by the China National Intellectual Property Administration in corresponding Chinese Patent Application No. 201880016304.3 and an English Translation of the Office Action. (17 pages).

Non-Final Office Action issued by the U.S. Patent and Trademark Office in the U.S. Appl. No. 15/914,461, dated Jun. 25, 2020, U.S. Patent and Trademark Office, Alexandria, VA. (40 pages).

Office Action (First Examination Report) dated Feb. 22, 2021, by the Patent Office, Government of India, in corresponding India Patent Application No. 201917034707 with an English Translation of the Office Action. (6 pages).

(56) References Cited

OTHER PUBLICATIONS

Office Action (Applicant-Initiated Interview Summary) issued by the U.S. Patent and Trademark Office in the U.S. Appl. No. 15/914,461, dated May 19, 2021, U.S Patent and Trademark Office, Alexandria, VA. (5 pages).

Office Action (Communication pursuant to Article 94(3) EPC) dated Jul. 2, 2021, by the European Patent Office in corresponding European Patent Application No. 18 715 162.6-1213. (9 pages).

Office Action (Notification of Third Office Action) dated Apr. 19, 2022, by the China National Intellectual Property Administration in corresponding Chinese Patent Application No. 201880016304.3 and an English Translation of the Office Action. (14 pages).

Non-Final Office Action issued by the U.S. Patent and Trademark Office in the U.S. Appl. No. 15/914,461, dated Mar. 1, 2022, U.S. Patent and Trademark Office, Alexandria, VA. (41 pages).

Non-Final Office Action issued by the U.S. Patent and Trademark Office in the U.S. Appl. No. 15/914,326, dated Mar. 3, 2022, U.S. Patent and Trademark Office, Alexandria, VA. (20 pages).

Office Action (Rejection Decision) dated Apr. 20, 2022, by the China National Intellectual Property Administration in corresponding Chinese Patent Application No. 201880016307.7 and an English Translation of the Office Action. (11 pages).

Office Action dated Jul. 8, 2022 in U.S. Appl. No. 15/914,461, by Bergner.

Office Action dated Jun. 17, 2022 in U.S. Appl. No. 15/914,326, by Bergner.

\* cited by examiner

METHOD AND SYSTEM FOR RECORDING POINT TO POINT TRANSACTION PROCESSING

FIELD

The present disclosure relates to a multi-services platform, specifically a multi-services platform that provides for the recording of transaction processing for point to point transactions as well as the registration and management of various entities and users of said entities and the recording of procurement data in a digital ledger.

BACKGROUND

Businesses rely on a complex ecosystem of technology, processes, and people internally as well as with thousands of business-to-business (B2B) solution providers and networks to manage their invoices and make or receive payments nearly every day. With the increasing number of entities engaging in financial transactions, the number of electronic payment transactions processed each day continues to grow, with the number often being in the magnitude of hundreds of billions each day. For example, for invoiced purchases, a buyer will approve payment to a supplier only after validating a purchase order (PO), an invoice, and a shipment confirmation related to the order—known as a "three-way match." Once approved, a payment is authorized, scheduled and disbursed. In many instances, an entity will conduct an electronic payment transaction with a payment instrument where the transaction is processed by a first payment network and then settled, where the actual funds are exchanged between the issuing and acquiring banks, by a second payment network.

Currently, existing settlement systems often operate using the settlement of individual payment transactions. For example, after a transaction is processed, the issuing bank will transfer funds for that single transaction to the settlement network, which will then forward the funds for that single transaction on to the acquiring bank. Since most businesses are not financial firms, or financially regulated, B2B transactional innovation left payment flows between the parties intact. As a result, 21st century B2B collaboration sits on an unwieldy, unconnected and largely unchanged mid-20th century B2B payments platform. As the number of transactions being processed, and therefore settled, increases, the strain on the processing power of settlement systems and those of financial institutions increases, as well as the number of fund transfers that must occur every day.

There are many issues in current B2B systems. For example, there are too many unconnected methods for monitoring, making, or accelerating payments. Suppliers may be left to their own costly efforts to determine credit risk of new customers. The supplier may have no real visibility into customer payment intent, adjustments to payment, or timing of payments which may be mitigated with costly collections activities and efforts. The buyer must maintain bank accounts of the supplier. The buyer may face higher bank fees for multiple payers.

Furthermore, in many cases, the heavy computing and processing power required to necessitate the settlement of such a large of volume of individual transactions may grow too great for existing settlement systems and financial institutions. Thus, there is a need for a technical solution to provide a disruptive, uniform settlement system which can reduce the amount of processing as well as the amount of communications and fund transfers. The uniform settlement system would also help to reduce the resources and processing power expended by settlement systems and financial institutions to provide for more efficient and cost-effective settlement of electronic payment transactions. Furthermore, the system must be configured to provide a variety of services to participating entities, including enabling one entity to add others into the system, which may be later claimed by the respective entity and users added in proper roles and hierarchies.

SUMMARY

The present disclosure provides a description of systems and methods for account management, entity claiming, and the registration of purchase order procurement status in a multi-services platform. A multi-services platform can provide a number of services to participating entities. Often times, such a platform may be operated and/or maintained by administrators, which may assist entities in the claiming of profiles, addition of users, specifying of roles and permissions, registration and approval of purchase orders, etc. The use of digital ledgers, such as blockchains, may further facilitate the services provided by such a platform, by enabling data to be stored clearly and in a format that is easily auditable by participating entities. In cases where ledgers like blockchains are used, the ledgers may be provided even more benefits as they may be immutable and resistant to tampering, which may further increase the reliability of such data. As a result, such a platform may provide a great number of services to entities while doing so in a manner that is more secure and transparent than any number of systems dedicated to even a single one of the multiple services.

A method for entity claiming in a services platform includes: storing, in a memory of a processing server, a plurality of entity profiles, wherein each entity profile includes at least identifying information; receiving, by a receiver of the processing server, a claim request, wherein the claim request includes at least the identifying information included in a specific entity profile of the plurality of entity profiles; electronically transmitting, by a transmitter of the processing server, authentication credentials to a computing device; receiving, by the receiver of the processing server, at least the authentication credentials and revised credentials from the computing device; receiving, by the receiver of the processing server, a public key of a cryptographic key pair; and executing, by the processing server, a query on the memory of the processing server to update the specific entity profile to include at least the revised credentials and the public key.

A system for entity claiming in a services platform includes: a memory of a processing server configured to store a plurality of entity profiles, wherein each entity profile includes at least identifying information; a receiver of the processing server configured to store a claim request, wherein the claim request includes at least the identifying information included in a specific entity profile of the plurality of entity profiles; and a transmitter of the processing server configured to electronically transmit authentication credentials to a computing device, wherein the receiver of the processing server is further configured to receive at least the authentication credentials and revised credentials from the computing device, and receive a public key of a cryptographic key pair, and the processing server is configured to execute a query on the memory of the processing server to update the specific entity profile to include at least the revised credentials and the public key.

A method for account management in a services platform includes: receiving, by a receiver of a processing server, hierarchy data for an entity, wherein the hierarchy data includes user data for a plurality of users, the user data including at least contact data for the respective user; executing, by the processing server, a query on a memory of the processing server to insert, for each of the plurality of users, a user profile in the memory that includes at least the respective user data and authentication credentials; electronically transmitting, by a transmitter of the processing server, the authentication credentials included in the respective user profile to each user of the plurality of users using the contact data for the respective user; receiving, by the receiver of the processing server, at least authentication credentials, revised credentials, and a public key of a cryptographic key pair for each user of the plurality of users; executing, by the processing server, a query on the memory of the processing server to update, for each of the plurality of users, the user profile in the memory to change the authentication credentials to the revised credentials and include the respective public key; generating, by the processing server, a ledger data entry for each of the plurality of users, wherein the ledger data entry includes at least the respective public key; and inserting, by the processing server, the generated ledger data entry for each of the plurality of users into a digital ledger.

A system for account management in a services platform includes: a receiver of a processing server configured to receive hierarchy data for an entity, wherein the hierarchy data includes user data for a plurality of users, the user data including at least contact data for the respective user; the processing server configured to execute a query on a memory of the processing server to insert, for each of the plurality of users, a user profile in the memory that includes at least the respective user data and authentication credentials; and a transmitter of the processing server configured to electronically transmit the authentication credentials included in the respective user profile to each user of the plurality of users using the contact data for the respective user, wherein the receiver of the processing server is further configured to receive at least authentication credentials, revised credentials, and a public key of a cryptographic key pair for each user of the plurality of users, and the processing server is further configured to execute a query on the memory of the processing server to update, for each of the plurality of users, the user profile in the memory to change the authentication credentials to the revised credentials and include the respective public key, generate a ledger data entry for each of the plurality of users, wherein the ledger data entry includes at least the respective public key, and insert the generated ledger data entry for each of the plurality of users into a digital ledger.

A method for registering purchase order procurement status includes: receiving, by a receiver of a processing server, a purchase order, wherein the purchase order includes at least an identification number, a buyer identifier, and a supplier identifier; converting, by the processing server, the purchase order according to one or more applicable standards; electronically transmitting, by a transmitter of the processing server, the converted purchase order to a computing device associated with the buyer identifier; receiving, by the receiver of the processing server, a digitally signed purchase order from the computing device, wherein the digitally signed purchase order is the converted purchase order digitally signed using a private key of a buyer cryptographic key pair associated with the buyer identifier; receiving, by the receiver of the processing server, a digitally signed acknowledgment message, wherein the digitally signed acknowledgment message is digitally signed using a private key of a supplier cryptographic key pair associated with the supplier identifier; generating, by the processing server, a hash value associated with the purchase order; and inserting, by the processing server, the generated hash value into a digital ledger.

A system for registering purchase order procurement status includes: a receiver of a processing server configured to receive a purchase order, wherein the purchase order includes at least an identification number, a buyer identifier, and a supplier identifier; the processing server configured to convert the purchase order according to one or more applicable standards; and a transmitter of the processing server configured to electronically transmit the converted purchase order to a computing device associated with the buyer identifier, wherein the receiver of the processing server is further configured to receive a digitally signed purchase order from the computing device, wherein the digitally signed purchase order is the converted purchase order digitally signed using a private key of a buyer cryptographic key pair associated with the buyer identifier, and receive a digitally signed acknowledgment message, wherein the digitally signed acknowledgment message is digitally signed using a private key of a supplier cryptographic key pair associated with the supplier identifier, and the processing server is further configured to generate a hash value associated with the purchase order, and insert the generated hash value into a digital ledger.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public, private, or permissioned ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Providing a Multi-Services Platform

Figure 1:
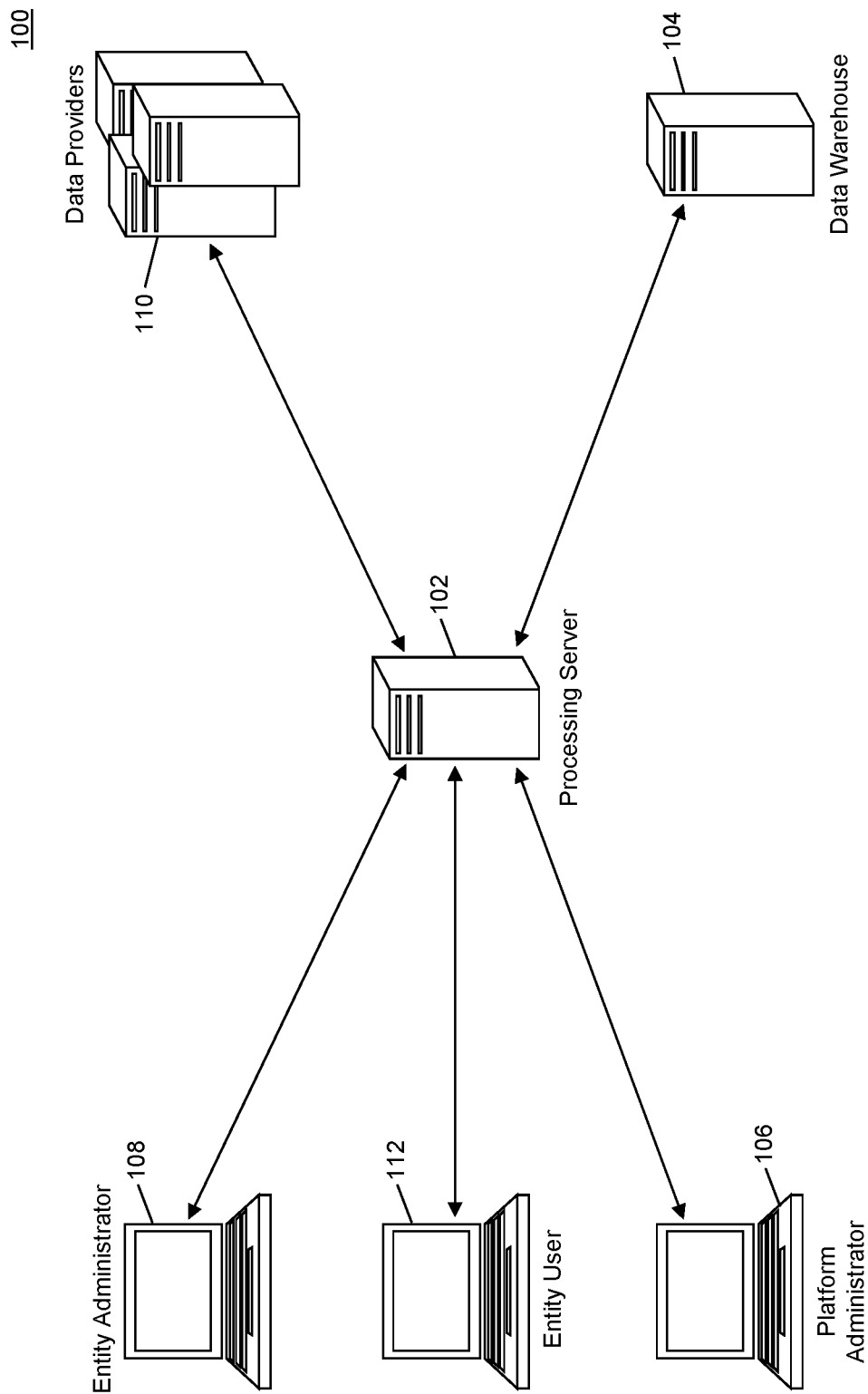
FIG. 1 is a block diagram illustrating a high level system architecture for a multi-services platform in accordance with exemplary embodiments.

FIG. 1 illustrates a system 100 for the providing of a multi-services platform managed by one or more administrators to a plurality of entities that may provide services for the entities and its users including the registering of procurement status for purchase orders.

The system 100 may include a processing server 102. The processing server 102, discussed in more detail below, may be configured to operate a multi-services platform. The multi-services platform may be a platform design to provide a plurality of different services to various entities. Such services may include the registration of procurement status for purchase orders, as well as additional services, such as the recording of point to point transactions and the processing of business-to-business (B2B) payments. Additional information regarding point to point transactions and B2B payments can be found in U.S. Patent Publication No. 2017/0270493, entitled "Method and System for Recording Point to Point Transaction Processing," filed Mar. 21, 2017, and U.S. Patent Publication No. 2016/0042327, entitled "Method and System for Processing of Business-to-Business Payment Transactions," filed Aug. 5, 2014, which are herein incorporated by reference in their entirety.

In the system 100, the processing server 102 may be configured to utilize data related to the services provided in the multi-services platform. The data may be stored locally in the processing server 102 and/or externally, such as in a data warehouse 104. A data warehouse 104 may be an external server, server farm, cloud storage, or other mechanism used for the external storage of data that may be accessed by the processing server 102 or other computer system through a suitable form of communication. For example, the processing server 102 may utilize cloud storage of the data warehouse 104 that is accessed via the Internet. In some cases, the data warehouse 104 may be managed, operated, and/or owned by the same entity that manages, operates, and/or owns the processing server 102. In other cases, the data warehouse 104 may be managed, operated, and/or owned by a third party.

The system 100 may include at least one platform administrator 106. The platform administrator 106, represented in the illustration of the system 100 in FIG. 1 by a computing device, may be an authorized user of the multi-services platform that is configured to perform administrative functions in the multi-services platform, including the creation and management of entities, users, and permissions, the addition and modification of other data, the creation and management of digital ledgers, etc. The platform administrator 106 may be, for instance, an employee of the entity that owns and/or operates the processing server 102, such as an information technology specialist that assists entity users of the platform. The platform administrator 106 may access the multi-services platform using a suitable computing device, such as a desktop computer, laptop computer, notebook computer, tablet computer, cellular phone, smart phone, smart watch, smart television, wearable computing device, implantable computing device, etc. The processing server 102 may have a user interface accessible via such a computing device, such as through a web page, application program, application programming interface, etc., which may be used to access functions provided by the multi-services platform. For example, a website may be used by the platform administrator 106 to create and manage entities and purchase orders in the multi-services platform.

As part of the multi-services platform, entities may be created in the platform. An entity may be a business, company, individual, etc., which may use the multi-services platform to avail itself of one or more services. In some cases, an entity may be created in the platform at the request of a different entity. For example, a registered entity that uses the multi-services platform may be a supplier of goods. When a new buyer that is not registered to the platform enters into an agreement to buy goods from the registered entity, the registered entity may (e.g., directly or through the platform administrator 106) have the new buyer added to the platform. In such cases, entities may be created in the platform where the entity as it exists in the platform may not have been claimed by the actual entity as a user of the platform. In these cases, the entity may communicate with the platform via the processing server 102 to claim the entity in the platform. In some instances, new entity information may be obtained from a third party. In such instances, the processing server 102 may receive information on additional entities that may be added into the platform for later claiming by the respective entity.

In the system 100, an entity administrator 108, represented in the illustration of the system 100 in FIG. 1 as a computing device, may claim an entity in the platform. The processing server 102 may have a plurality of entities registered therein, which may be unclaimed. Each entity may have identifying information stored in an entity profile related thereto, where the identifying information may be data that is unique to the related entity and/or entity profile. For example, the identifying information may be a name of the entity, identification number, street address, telephone number, or a combination of data values that, when combined, is unique to the entity. The entity administrator 108 may, using a suitable user interface for communicating with the processing server 102, submit a claim request for an entity that includes the identifying information for the entity. In some embodiments, the entity administrator 108 may submit the claim request after being presented with a directory of entities. For instance, the processing server 102 may maintain a trade directory of all registered entities, which may be browsed by the entity administrator 108. The entity administrator 108 may select an entity from the trade directly for claiming, which may submit a claim request to the processing server 102. In some cases, both claimed and unclaimed entities may be listed in such a directory. In other cases, the entity administrator 108 may only be able to select from unclaimed entities.

In cases where the selected entity is unclaimed, the processing server 102 may generate a set of authentication credentials for the entity administrator 108, such as username and password or other suitable type of credentials. In some cases, a user may be created in the platform for the entity administrator 108, where the credentials may be assigned to the new user. In cases where the selected entity is already claimed, the processing server 102 may first perform a dispute resolution process to determine if the entity administrator 108 is the proper claimant or if the already-registered entity is the proper claimant. Such determinations may vary depending on the industry of the entities, the identity of each of the entities, the availability of information, the type of information provided by the entities, etc. For instance, in one example, the processing server 102 may identify records associated with the entity, such as incorporation records registered with a governmental jurisdiction and compare such records with proof provided by each entity. For example, each entity may prove the address to their place of business, which may be compared to an address registered to the entity being claimed. If the determination is that the entity administrator 108 does not have a right to claim the selected entity, the entity administrator 108 may be informed accordingly and the claiming process stopped. If the entity administrator 108 is the rightful claimant, then new authentication credentials may be generated and transmitted to the entity administrator 108.

The entity administrator 108 may receive the authentication credentials for the selected entity. The entity administrator 108 may then log in to the platform using the provided authentication credentials. In an exemplary embodiment, the entity administrator 108 may be required to set new credentials upon the first login to the platform. For instance, the authentication credentials may include a temporary password that may need to be replaced by the entity administrator 108 the first time they log in to use the multi-services platform. In such cases, the processing server 102 may update the user profile for the entity administrator 108 to update the credentials accordingly.

In some embodiments, claiming of the entity may also include the generation of a cryptographic key pair for the entity for use by the entity administrator 108. The cryptographic key pair may be generated using any suitable key generation algorithm and be comprised of a private key and a public key. In some embodiments, the entity administrator 108 may generate the cryptographic key pair locally, and may retain the private key and provide the public key to the processing server 102, such as when providing the new authentication credentials. In other embodiments, the processing server 102 may generate the cryptographic key pair and may provide the private key to the entity administrator 108, such as when providing the authentication credentials or after the entity administrator 108 has updated the credentials. In these cases, the public key may be stored in the entity profile for the claimed entity and/or in the user profile associated with the entity administrator 108.

In some embodiments, data associated with entity claiming may be stored in a digital ledger. A digital ledger may be a data file that is configured to store data that may be accessed by the processing server 102 (e.g., either locally or via the data warehouse 104). In some embodiments, the digital ledger may be rewritable, such that data stored in the digital ledger may be modified. For instance, if an entity is claimed, where such a claim is later disputed and control provided to a new entity administrator 108, the digital ledger may be modified to have a public key associated with the first administrator replaced with the public key provided by the new entity administrator 108. In other embodiments, data stored in the digital ledger may be immutable.

For instance, in some embodiments, the digital ledger may be a blockchain. In such an embodiment, the processing server 102 may be a node in a blockchain network, or may independently maintain a blockchain for use as a digital ledger configured to store entity data. The blockchain may be a public or private blockchain comprised of a plurality of blocks, where each block includes a block header and one or more data values. Each data value may include data related to an entity, where such data may be based on a function being performed. For instance, a data value may include credentials, a public key, identifying information, purchase orders, purchase order procurement status, user information, user roles, etc. In some cases, some or all of the data stored in a data value may be hashed prior to inclusion in the data value. In such cases, the data values may be used for auditing purposes, but may otherwise be ineffective for use by entity administrators 108 and other users as the hash values may not be reversed. A block header may include at least a timestamp, a block reference value, and a data reference value. The timestamp may be a time at which the block was generated or other suitable time.

The block header may be a reference value that refers to an earlier block in the blockchain, such as the immediately preceding block. In some cases, the block reference value may be a reference to the block header of the earlier block. In some embodiments, the block reference value may be a hash value generated via the application of one or more hashing algorithms to the block header of the earlier block. The data reference value may be a reference to the one or more data values included in the block, such as a hash value generated via the application of one or more hashing algorithms to the one or more data values. In some such cases, the data reference value may be the root of a Merkle tree generated using the data values. The use of reference values may contribute to the immutability of the blockchain, as attempted modification to any data value would require modification to that block's data reference value, which would change the block header and thus also require modification to the next block's block reference value, which would change that block's header and require modification to the following block's block reference value, and so on. In cases where the blockchain is maintained by a plurality of nodes, such modifications would have to be performed on every copy of the blockchain across a majority of the nodes.

As such, modification to any data in the blockchain may be computationally impossible due to processing and network limitations. Methods for the generation and verification of new blocks and addition of blocks to the blockchain will be apparent to persons having skill in the relevant art.

In such an embodiment, the processing server 102 may be configured to generate a new data value when the entity administrator 108 claims the entity, which may be configured to store at least the public key for the claimed entity. In some cases, the data value may also include identifying information for the claimed entity, and may also or alternatively including information identifying the entity administrator 108, such as a username, device identifier, etc. In some embodiments, claiming of the entity may also include the registration of a unique identifier for the entity by the entity administrator 108. For instance, the entity administrator 108 may select a unique value for use in identifying the claimed entity in future communications made by the entity administrator 108 or other users of the entity. In some instances, the unique value may be part of the authentication credentials. In some such instances, the unique value may be selected during the submission of the claim request. In these embodiments, the data value in the digital ledger may also include the unique identifier.

The entity may thus be claimed by the entity administrator 108. After claiming has been completed, the entity administrator 108 may be able to perform functions for the entity in the multi-services platform, such as the submission of new purchase orders, approval of purchase orders, modification of user roles and permissions, updating of entity biographical information, etc. The entity administrator 108 may also be configured to create and manage users for the entity for use in accessing the services provided by the processing server 102 as part of the multi-services platform. In such embodiments, the entity administrator 108 may submit hierarchy data for a plurality of users for the entity. The hierarchy data may include at least contact data for each of the users, and may include any additional data that may be necessary for use of the multi-services platform. Such data may include, for instance, role and/or permission data for each user (e.g., to control what services each user may access and what functions may be performed), user biographical information, etc. The processing server 102 may receive the data and may store the data in memory of the processing server 102, either locally or in the data warehouse 104. In some cases, the user hierarchy data may be stored in the entity profile of the claimed entity. In other cases, user profiles may be generated for each of the users, which may be referenced in the entity profile of the claimed entity. For instance, a unique identifier may be generated for each user, where the unique identifiers may be stored in the entity profile, or each user profile may include the unique identifier for the claimed entity.

When a new user is created by the entity administrator 108, the processing server 102 may generate authentication credentials for that user and then electronically transmit the credentials to the entity user 112 using the contact information that was included in the user data. The contact information may be, for instance, an e-mail address, telephone number, device identifier, or other information that may be used to facilitate the transmission of the authentication credentials to a computing device (used to represent the entity user 112 in the illustration of the system 100 in FIG. 1) using a suitable communication method. The entity user 112 may, using the computing device, receive the authentication credentials and, using the credentials, log in to the processing server 102 to register their account. As part of the registration, the entity user 112 may update their credentials, such as by setting a new password after using a temporary password included in the authentication credentials. The processing server 102 may update the user profile and/or entity profile to update the credentials associated with the entity user 112.

In some embodiments, each entity user 112 may register a public key of a cryptographic key pair with the processing server 102. In such embodiments, the entity user 112 or the processing server 102 may generate a cryptographic key pair using a suitable key generation algorithm. In cases where the entity user 112 generates the key pair, the entity user 112 may provide the public key to the processing server 102 during registration of the entity user 112. In cases where the processing server 102 generates the key pair, the processing server 102 may provide the private key to the entity user 112, such as when providing the authentication credentials or following the first log in of the entity user 112 to the multi-services platform. The public key may be stored in the user profile or entity profile, as applicable.

In some embodiments, the processing server 102 may be configured to maintain a digital ledger for the storage of user data. In some cases, a single digital ledger may be used to store all data associated with the entity. For instance, the digital ledger used to store the data associated with claiming of the entity may also be used to store the data for the entity users 112 of the entity. In other cases, a separate digital ledger may be used to store user data. In some instances, one digital ledger may be used to store all data for all entities of the multi-services platform, where the unique identifier for an entity may be used to identify data values associated with that entity. In other instances, each entity may have a separate digital ledger. The processing server 102 may be configured to generate data values for user data, which may include, for instance, the public key associated with the entity user 112, and any other user data. For example, role and hierarchy data provided by the entity administrator 108 may be stored in a data value for the entity user 112. In some cases, the digital ledger used to store user data may be a blockchain.

Once an entity has been claimed and administrators and users are registered in the processing server 102, the services provided by the multi-services platform may be accessed by the entity users 112 and entity administrator 108. One such service that may be offered by the processing server 102 may include the facilitation of purchase orders. The facilitation of purchase orders may include the ability for an entity to submit new purchase orders for approval by another entity (e.g., the buyer or supplier), the processing of transactions related to a purchase order, and the registration of status related to the purchase order for view and access by each entity. As used herein, "purchase order" may refer to any procurement document that may be used in conjunction with the methods and systems discussed herein. For instance, the methods discussed herein may be applicable to invoices, goods receipt notices, three way matches, or other procurement documents.

In such embodiments, the processing server 102 may receive a purchase order. In some cases, the purchase order may be submitted to the platform directly by an entity involved (e.g., as buyer or supplier) in the purchase order. For instance, an entity user 112 of one of the entities may submit the purchase order through a suitable interface and communication mechanism of the processing server 102. In other cases, a third party service may submit the purchase order to the processing server 102. For example, the system 100 may include one or more third party data providers 110.

The data providers 110 may be configured to electronically transmit data to the processing server 102 for use in performing the functions disclosed herein. In one example, a data provider 110 may be an accounting service that is used by one of the entities for the management of inventory. The entity user 112 may, through the data provider 110, create a purchase order for the purchase of products from a supplier. The data provider 110 may then submit the purchase order to the processing server 102. In another example, a buyer may provide a purchase order to a supplier via a data provider 110, where the supplier may request that all purchase orders be submitted to the processing server 102. In such an example, the data provider 110 or the supplier may submit the purchase order to the processing server 102.

The processing server 102 may receive the purchase order using any suitable method. The purchase order may include at least an identification number or other value unique to the purchase order, a buyer identifier, and a supplier identifier. The buyer identifier and supplier identifier may be values used to identify the buyer and supplier for the purchase order, respectively. In some cases, the buyer identifier and supplier identifier may be the unique identifier associated with an entity in the processing server 102. For example, when an entity administrator 108 claims an entity and sets a unique identifier for that entity, that unique identifier may be used by the entity in any future purchase orders. The purchase order may also include any additional data suitable for use in a purchase order, such as product details, transaction amount, delivery date, shipping information, etc.

The processing server 102 may be configured to convert the received purchase order according to one or more standards. Conversion of the purchase order may ensure that all purchase orders, which may be submitted by multiple entities and/or through multiple data providers 110, follow the same formatting when entered into the multi-services platform. In some cases, the standards may be set by the processing server 102. In other cases, the processing server 102 may use standards provided by a third party organization, such as a standards organization. In some instances, one or more entities may submit purchase orders that are already formatted using the applicable standard(s). In such instances, the processing server 102 may verify that the purchase order is properly formatted, and may not perform any conversion of the purchase order.

Once the purchase order is formatted appropriately, the processing server 102 may electronically transmit the formatted purchase order to the buyer entity. In some cases, the purchase order may be transmitted to an entity user 112 or entity administrator 108 that is identified for receipt of purchase orders, such as in the roles or hierarchies set by the entity administrator 108 for the entity. In other cases, the formatted purchase order may be transmitted to a default entity user 112, which may forward the formatted purchase order to the appropriate entity user 112 as required. In yet other cases, formatted purchase orders may be stored by the processing server 102 (e.g., locally or in the data warehouse, which may store the data in a digital ledger, such as a blockchain), which may be viewed by an entity user 112. In some such cases, one or more entity users 112 may be notified that a new purchase order has been received, where the entity user 112 may then log in to the multi-services platform to view the purchase order. In instances where a buyer (e.g., or supplier, as applicable) may not exist in the platform, the processing server 102 may first generate an entity profile for the entity and then reach out to an entity administrator 108 (e.g., identified in the purchase order or by the other entity) for claiming of the entity.

The buyer may approve the purchase order. Approval of the purchase order may be conveyed via an entity user 112 (e.g., or the entity administrator 108, as applicable) digitally signing the purchase order. The purchase order may be digitally signed using the private key of the cryptographic key pair registered to the entity user 112 using a suitable signing algorithm. The digitally signed purchase order may then be submitted back to the processing server 102 using a suitable interface and communication method. The processing server 102 may verify the digital signature to ensure that the buyer has approved the purchase order and that the buyer is genuine (e.g., part of the entity and authorized to approve purchase orders). Verification of the digital signature may be performed using the corresponding public key in accordance with the signing algorithm used to generate the digital signature. Verifying that the buyer is genuine may include verifying that the entity user 112 that signed the purchase order is part of the entity, and that the entity user 112 has permission to sign purchase orders on behalf of the entity based on role and hierarchy data of the entity user 112 and/or entity (e.g., as identified in the entity profile and/or user profile, verifiable through the digital ledger). Verification through the digital ledger may include, for instance, hashing the role data for the entity user 112 and comparing it to a data value in the digital ledger to ensure that the set role is accurate (e.g., has not been tampered with).

In addition to the buyer, the processing server 102 may also require the supplier to approve the purchase order. In some cases, the supplier may digitally sign the purchase order as well (e.g., after accessing the formatted purchase order using the processing server 102 or being transmitted the purchase order from the processing server 102). In other cases, the supplier may view the formatted purchase order and digitally sign an acknowledgment message that is transmitted to the processing server 102. The acknowledgment message may include at least the identification number for the purchase order, where the message indicates that the purchase order is approved or otherwise acknowledged for fulfillment by the supplier. The digital signature may be generated using a private key of a cryptographic key pair of an entity user 112 of the supplier that is authorized to acknowledge purchase orders. The processing server 102 may be configured to verify the digital signature of the acknowledgment message using the corresponding public key.

Once the buyer and supplier have both approved the purchase order, the processing server 102 may store the approved, formatted purchase order in a digital ledger. In some cases, the digital ledger may be the same digital ledger used to store entity and user data. In other cases, a separate digital ledger may be used to store purchase order data. In some instances, the approved, formatted purchase order may be stored directly in the ledger. In other instances, the processing server 102 may generate a hash value of the purchase order, which may be stored in the digital ledger in place of the actual purchase order. The hash value may be generated via applying one or more hashing algorithms to the formatted purchase order or data associated therewith, such as the identification number and a timestamp of the approval time of the purchase order. In some cases, the digital signatures may also be included in the data value or used in generation of the hash value. In some embodiments, a data value may be separately created for the approval of the purchase order by each of the buyer and the supplier.

The approved, formatted purchase order may thus be stored in an immutable format in the digital ledger. This may provide auditability of the purchase order by each of the entities, as the hash value may be unique such that any modification to the purchase order would result in a different hash value, thus enabling each entity to prove the purchase order as it was approved at the time of the approval. Any time the status of the purchase order is updated, a new data value may be added to the digital ledger that reflects the updated status. For instance, when the product is packaged, shipped, delivered, or paid for, a new ledger entry may be created with the status included in the data value. Such updates may be received from the buyer, supplier, or data providers 110. In some cases, both the buyer and supplier may have to approve an update (e.g., via their digital signatures) before the data may be stored in the ledger, such as to prevent fraud by one of the entities. In some embodiments, the processing server 102 may be configured to facilitate payment and settlement for purchase orders. In such embodiments, the processing server 102 may identify when payment and settlement occurs accordingly, and may update the status of the purchase order without explicit approval of the entities.

The methods and systems discussed herein provide for a multi-services platform that enables entities to avail themselves of services in the platform including performing functions related to other entities that may not yet be directly registered. In such instances, an entity may later be claimed, where the claiming of the entity may be recorded and documented in a digital ledger in a manner that may prevent fraud. Similarly, users may be created for an entity with roles and hierarchies that are stored in a digital ledger and immutable, preventing nefarious actors, both within the entity and outside of the entity, from performing unauthorized actions on behalf of the entity in the platform. This includes the submission and updating of purchase orders, where the use of a digital ledger and digital signatures ensures that the status of the purchase order is verifiable and that the purchase order itself is immutable where the purchase order may be audited by any entity during the entire process to ensure accuracy. The processing server 102 thus provides for improved services provided to entities in entity claiming, account management, and registration of procurement status for purchase orders.

Processing Server

Figure 2:
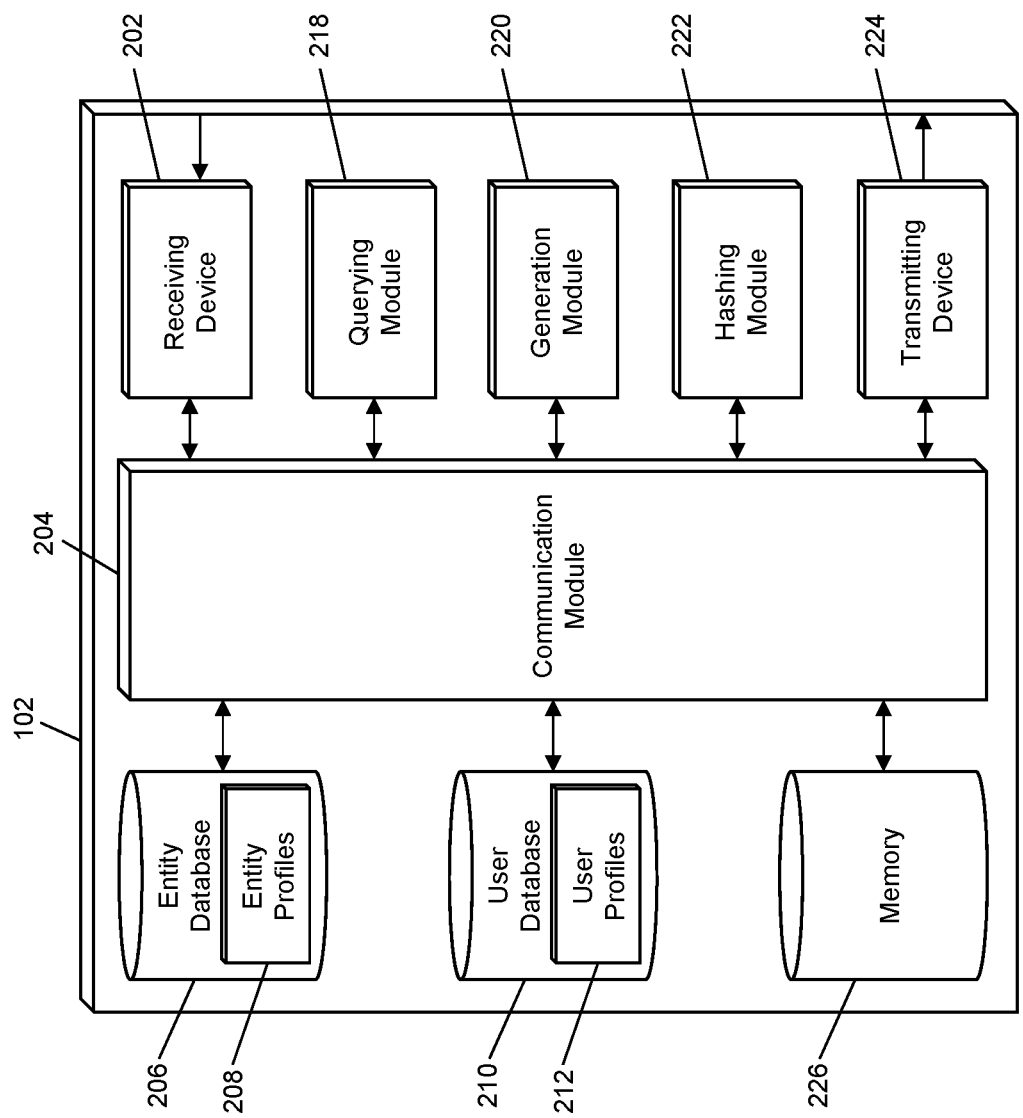
FIG. 2 is a block diagram illustrating the processing server of the system of FIG. 1 for entity claiming and account management in a services platform and the registration of procurement status for purchase orders in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 900 illustrated in FIG. 9 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from data warehouses 104, platform administrators 106, entity administrators 108, entity users 112, data providers 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by data warehouses 104 that are superimposed or otherwise encoded with data used in performing the functions of the processing server 102, such as digital ledger data, entity profiles, user profiles, etc. The receiving device 202 may be configured to receive data signals from platform administrators 106, entity administrators 108, and entity users 112 that may be superimposed or otherwise encoded with data used in performing actions in the multi-services platform. Such data may include, for instance, unique identifiers, digital signatures, public keys, role and hierarchy data, authentication credentials, revised credentials, etc. The receiving device 202 may also be configured to receive data signals electronically transmitted by data providers 110, which may be superimposed or otherwise encoded with purchase orders, contact data, data regarding claiming disputes, or other data used by the processing server 102 in performing the functions discussed herein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, hashing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an entity database 206. The entity database 206 may be configured to store a plurality of entity profiles 208 using a suitable data storage format and schema. The entity database 206 may be a relational database that utilizes structured query language for the storage, identification, modifying, updating, accessing, etc. of structured data sets stored therein. Each entity profile 208 may be a structured data set configured to store data related to an entity involved in the multi-services platform, which may include both claimed entities and unclaimed entities. An entity profile 208 may be configured to store at least a unique identifier and/or other identifying information associated with the related entity, and may also include a public key of a cryptographic key pair associated with the related entity or an entity administrator 108 of that entity. In some cases, an entity profile 208 may also be configured to store role and hierarchy data for users of the entity. In some instances, user data may be stored in an entity profile 208, such as in the form of a user profile, discussed below.

The processing server 102 may also include a user database 210. The user database 210 may be configured to store a plurality of user profiles 212 using a suitable data storage format and schema. The user database 210 may be a relational database that utilizes structured query language for the storage, identification, modifying, updating, accessing, etc. of structured data sets stored therein. Each user profile 212 may be a structured data set configured to store data related to a user of the multi-services platform, such as an entity administrator 108 or an entity user 112. A user profile 212 may include a unique identifier associated with the user, authentication credentials that the user uses to authenticate themselves when accessing the platform, and a public key of a cryptographic key pair associated with the related user. In some cases, role or hierarchy data for the user may be stored in the user profile 212. In some instances, a user profile 212 may also include a unique identifier for an entity to which the related user belongs.

The processing server 102 may include a querying module 218. The querying module 218 may be configured to execute queries on databases to identify information. The querying module 218 may receive one or more data values or query strings, and may execute a query string based thereon on an indicated database, such as the entity database 206, to identify information stored therein. The querying module 218 may then output the identified information to an appropriate engine or module of the processing server 102 as necessary. The querying module 218 may, for example, execute a query on the entity database 206 to update an entity profile 208 to update revised authentication credentials and store a public key when the related entity is claimed.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate cryptographic key pairs, authentication credentials, new entity profiles 208 and user profiles 212, unique identifiers, etc. The generation module 220 may also be configured to generate data values, such as for inclusion in a digital ledger. In instances where the processing server 102 may be a node in a blockchain network, the generation module 220 may be configured to generate new block headers and blocks for addition to the blockchain.

The processing server 102 may also include a hashing module 222. The hashing module 222 may be configured to hash data to generate hash values as part of the functions of the processing server 102 as discussed herein. The hashing module 222 may receive instructions as input, which may be accompanied with or used to identify data to be hashed, may apply one or more hashing algorithms to the data to generate a hash value, and may output the hash value to another module or engine of the processing server 102. The hashing module 222 may, for example, be configured to generate hash values from purchase orders, entity data, user data, role and hierarchy data, etc. In cases where the processing server 102 is a node in a blockchain network, the hashing module 222 may be configured to hash block headers and data values to generate reference values for inclusion in the blockchain.

The processing server 102 may also include a transmitting device 224. The transmitting device 224 may be configured to transmit data over one or more networks via one or more network protocols. In some instances, the transmitting device 224 may be configured to transmit data to data warehouses 104, platform administrators 106, entity administrators 108, entity users 112, data providers 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to data warehouses 104 that are superimposed or otherwise encoded with requests for data or data to be stored. The transmitting device 224 may be configured to electronically transmit data signals to platform administrators 106, entity administrators 108, and entity users 112, which may be superimposed or otherwise encoded with authentication credentials, unique identifiers, purchase orders, private keys, or other data used in performing the functions discussed herein. The transmitting device 224 may also be configured to electronically transmit data signals to data providers 110 that may be superimposed or otherwise encoded with data requests.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, digital ledgers, which, in some instances, may be blockchains. Digital ledgers may be used to store entity data, user data, purchase data, and any other data for the multi-services platform. In some cases, there may be a single digital ledger used to store all data associated with users and entities in the platform. The memory 226 may also be configured to store rules and data used in performing dispute resolution for entity claiming.

Process for Entity Claiming

Figure 3:
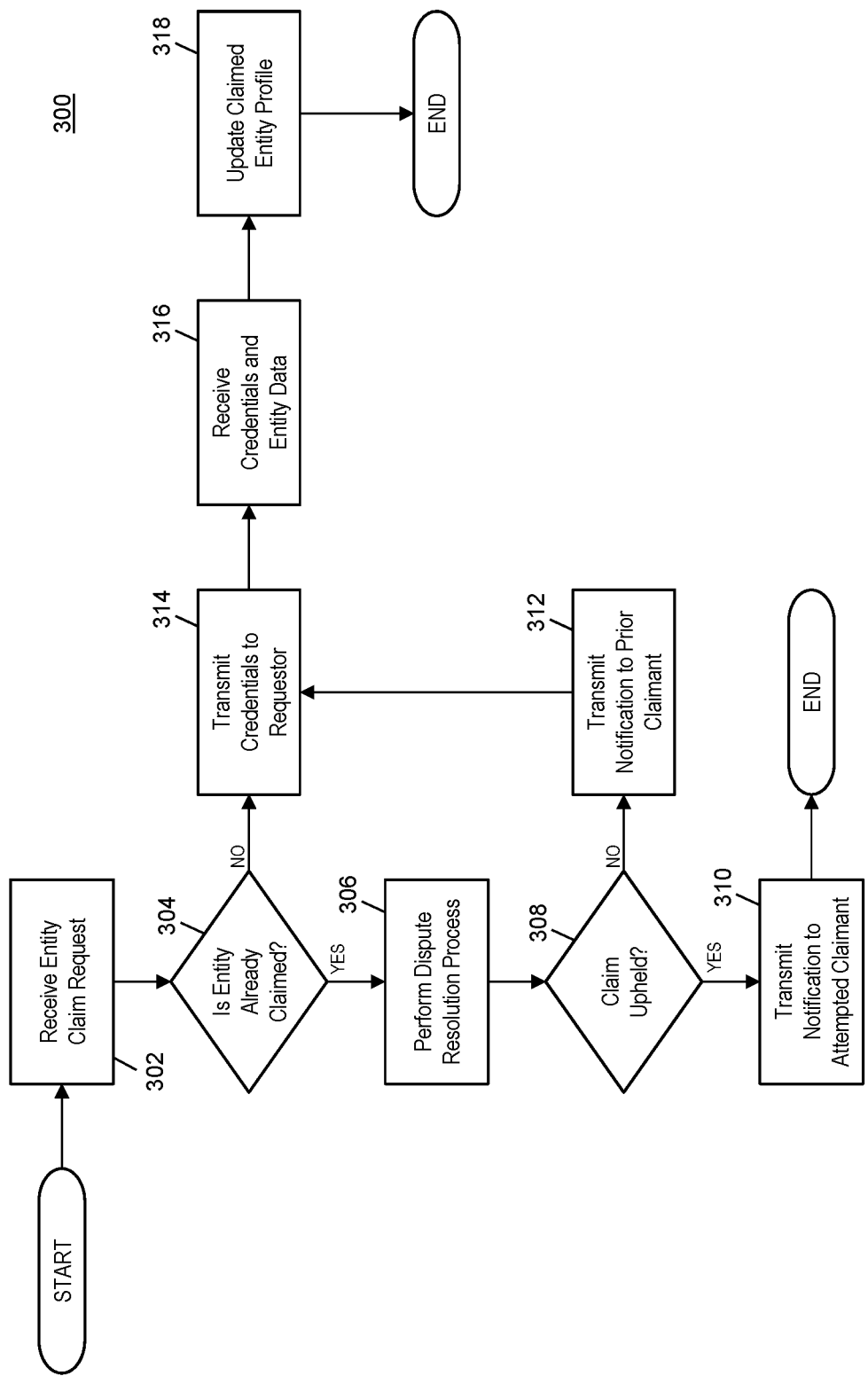
FIG. 3 is a flow diagram illustrating a process for entity claiming in a services platform performed by the processing server of FIG. 2 in accordance with exemplary embodiments.

FIG. 3 illustrates an example process 300 for the claiming of an entity in the multi-services platform of the processing server 102.

In step 302, the receiving device 202 of the processing server 102 may receive a claim request from an entity administrator 108, submitted using a suitable interface and communication method. The claim request may include at least identifying information for an entity to be claimed by the entity administrator. In step 304, the processing server 102 may determine if the selected entity is already claimed. The determination may be based on data stored in an entity profile 208 for the selected entity in the entity database 206, which may indicate if the entity has already been claimed. If an entity profile 208 for the selected entity does not exist, the querying module 218 of the processing server 102 may execute a query on the entity database 206 to generate a new entity profile 208 for the entity, which will accordingly be determined to be unclaimed.

If the selected entity has already been claimed, then, in step 306, the processing server 102 may perform a dispute resolution process to identify if the entity on whose behalf the administrator 108 is the entity that was selected. In step 308, the processing server 102 may identify if the existing claim on the entity is upheld or not, based on the result of the dispute resolution process. If the claim is upheld, then in step 310, the transmitting device 224 of the processing server 102 may electronically transmit a notification to the entity administrator 108 that their attempt to claim the entity was unsuccessful. In some cases, the notification may include information indicating why the attempt was unsuccessful, such as the data used to determine that the existing claimant is proper.

If the existing claim is not upheld, then, in step 312, the transmitting device 224 of the processing server 102 may electronically transmit a notification to the prior claimant (e.g., to their entity administrator 108) that their claim was disputed and that they have lost control of that entity in the platform. In some instances, the notification may provide the prior claimant with an opportunity to appeal the decision. The process may then proceed to step 314.

If, in step 304, the processing server 102 determines that the selected entity was not already claimed or, in step 308, the processing server 102 determines that the entity administrator 108 has the right to claim the entity, then, in step 314, the generation module 220 of the processing server 102 may generate new authentication credentials for the entity, which may then be electronically transmitted, by the transmitting device 224 of the processing server, to the entity administrator 108. The entity administrator 108 may receive the authentication credentials, and use them to log in to the platform. In step 316, the receiving device 202 of the processing server 102 may receive revised credentials (e.g., replacing the temporary password) and other data associated with the entity from the entity administrator, including at least a unique identifier and a public key of a cryptographic key pair. In step 318, the querying module 218 of the processing server 102 may execute a query on the entity database 206 to update the entity profile 208 to update the credentials and store the unique identifier and public key.

Process for Access Management

Figure 4:
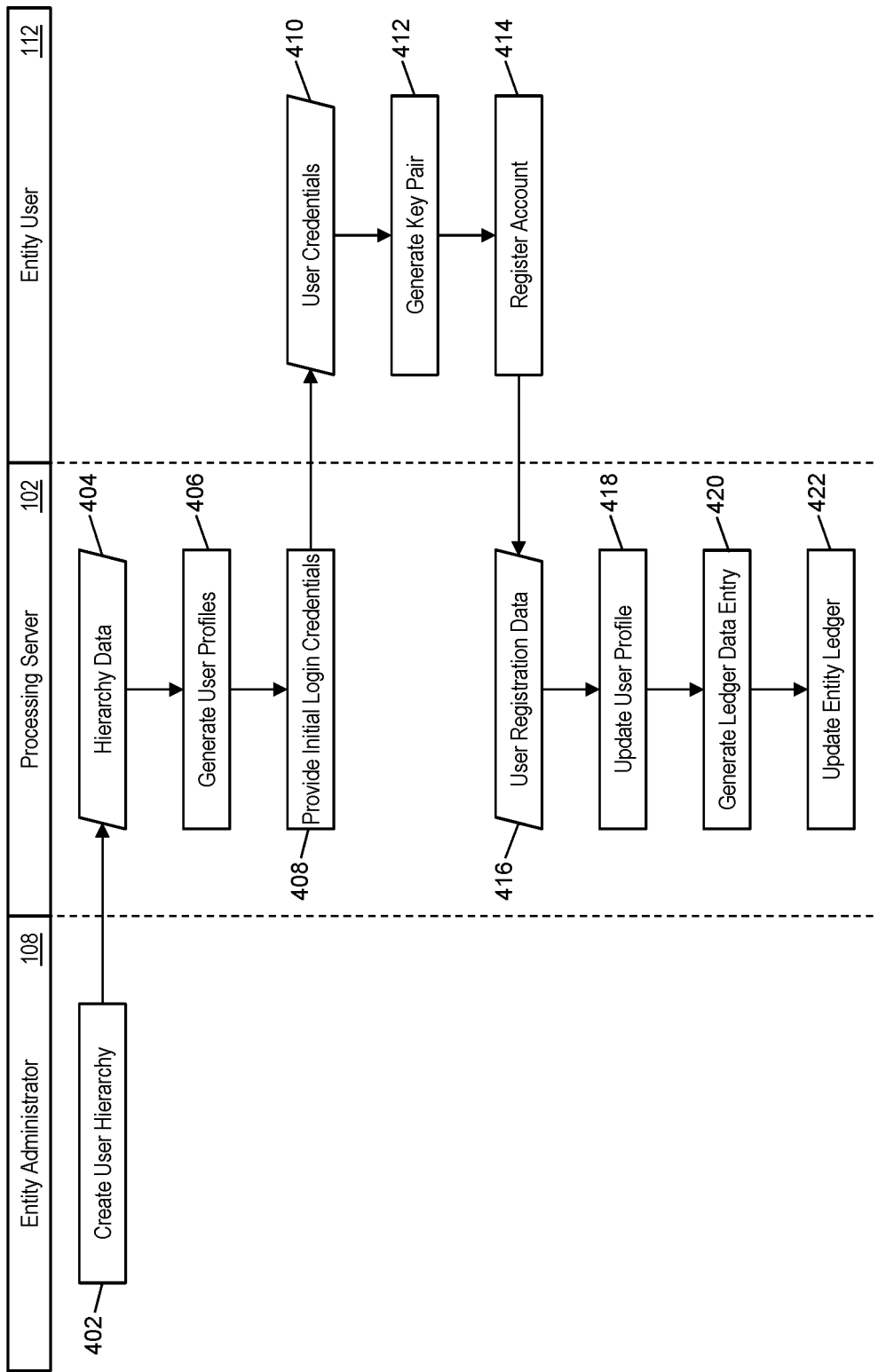
FIG. 4 is a flow diagram illustrating a process for account management including registration of additional users in the system of FIG. 1 in accordance with exemplary embodiments.

FIG. 4 illustrates an example process for providing access management to an entity for the registration and configuration of users for the entity in the multi-services platform provided by the processing server 102 of the system 100.

In step 402, an entity administrator 108 for an entity may, via their computing device, create a user hierarchy for users of the entity in the multi-services platform via a suitable interface of the processing server 102. The user hierarchy may include user data for a plurality of entity users 112 for the entity, as well as role and hierarchy data for each of the users. The user data for each user may include at least contact information for each of the users. In step 404, the receiving device 202 of the processing server 102 may receive the user hierarchy data.

In step 406, the generation module 220 of the processing server 102 may generate initial authentication credentials for each of the users, and the querying module 218 of the processing server 102 may execute queries on the user database 210 of the processing server 102 to insert a new user profile 212 into the user database 210 for each of the plurality of users in the hierarchy data. Each user profile 212 may include the user data received for the respective entity user 112. In some cases, the querying module 218 may also execute a query on the entity database 206 to update the entity profile 208 related to the entity to add the role and hierarchy data thereto. In step 408, the transmitting device 224 of the processing server 102 may electronically transmit the initial authentication credentials to each of the entity users 112 using the contact information associated with the respective user.

In step 410, each entity user 112 may receive their initial authentication credentials. In step 412, the entity user 112 may generate a cryptographic key pair comprised of a public key and private key using a suitable key generation algorithm. In step 414, the entity user 112 may log in to the multi-services platform of the processing server 102 using the initial authentication credentials. As part of the logging in, the entity user 112 may provide revised credentials (e.g., such as by supplying a permanent password to replace a temporary password) as well as the public key of the cryptographic key pair. In step 416, the receiving device 202 of the processing server 102 may receive the user's public key and revised credentials.

In step 418, the querying module 218 of the processing server 102 may execute a query on the user database 210 to update the user profile 212 related to the entity user 112 to incorporate the revised credentials and to store the public key therein. In step 420, the generation module 220 of the processing server 102 may generate a ledger data entry for the new entity user 112 for storage in the digital ledger. In some cases, the generation of the ledger data entry may include the hashing of user data (e.g., a unique identifier, public key, etc.), which may be used as or included in the ledger data entry. In step 422, the querying module 218 or other suitable module or engine of the processing server 102 may update the digital ledger for the entity, such as by generating, verifying, and adding a new block to the blockchain that includes the ledger data entry as a data value therein.

Process for Purchase Order Procurement

Figure 5:
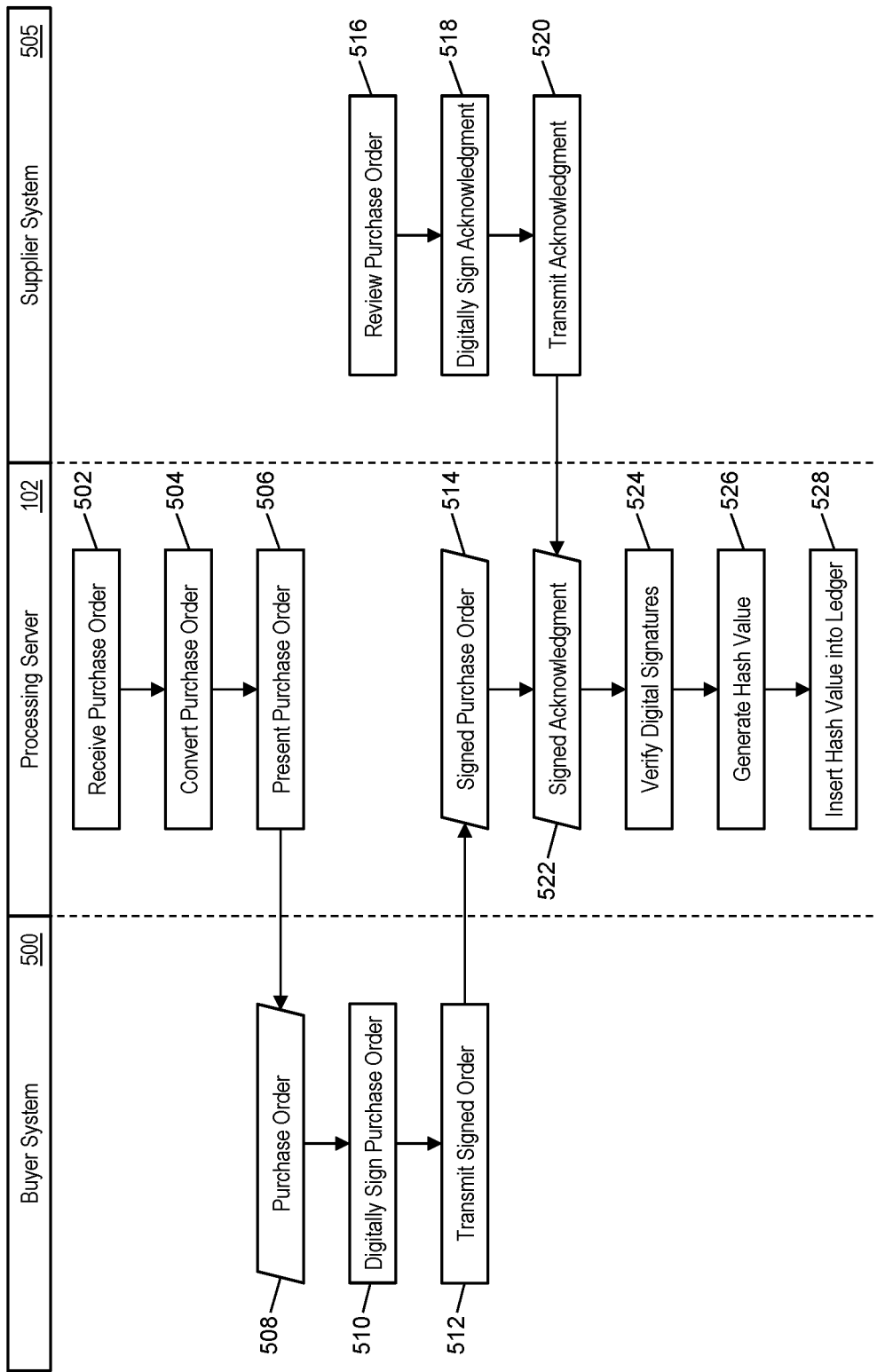
FIG. 5 is a flow diagram illustrating a process for registering the procurement status of purchase orders in the system of FIG. 1 in accordance with exemplary embodiments.

FIG. 5 illustrates an example process for the registration of a purchase order and procurement thereof in a digital ledger using the multi-services platform of the processing server 102 in the system 100.

In step 502, the receiving device 202 of the processing server 102 may receive a purchase order, such as may be transmitted thereto by a data provider 110 or submitted by an entity user 112 or entity administrator 108 of an entity involved in the purchase order. The purchase order may include at least an identification number unique to the purchase order, and a buyer identifier and supplier identifier associated with the entities involved in the purchase order. In step 504, the generation module 220 of the processing server 102, or another suitable module or engine of the processing server 102, may format the purchase order according to one or more applicable standards. In step 506, the formatted purchase order may be electronically transmitted to a buyer system 500, which may be an entity user 112 or entity administrator 108 authorized by the buyer, such as may be indicated in an entity profile 208 related to the buyer (e.g., where role or hierarchy information may indicate what entity user 112 is to receive purchase orders for approval).

In step 508, the buyer system 500 may receive the purchase order. In step 510, the buyer system 500 may approve the purchase order by digitally signing the purchase order using a private key of a cryptographic key pair associated with the buyer system 500 and a suitable signing algorithm. In step 512, the buyer system 500 may electronically transmit the signed purchase order to the processing server 102. In step 514, the receiving device 202 of the processing server 102 may receive the signed purchase order.

In step 516, a supplier system 500 may review the formatted purchase order. The supplier system 500 may be the computing device of an entity user 112 or entity administrator 108 of an entity involved in the purchase order as the supplier. The supper system 500 may review purchase orders pending for the supplier using a suitable interface and communication method with the processing server 102, including reviewing the formatted purchase order received by the processing server 102 in step 502. In step 518, the supper system 500 may generate an acknowledgment message, which may include at least the identification number or other information identifying the purchase order being approved, and may digitally sign the acknowledgment message using a private key of a cryptographic key pair associated with the supplier system 505 using a suitable signing algorithm. In step 522, the receiving device 202 of the processing server 102 may receive the signed acknowledgment message. In some embodiments, steps 516 through 522 may be conducted concurrently or prior to steps 506 through 514.

In step 524, the processing server 102 may verify the digital signatures provided by the buyer system 500 and supplier system 505. The digital signatures may be verified using the public key of the cryptographic key pair associated with the respective systems in accordance with the signing algorithm used to generate the digital signatures. In some cases, the processing server 102 may also verify that the buyer system 500 and supplier system 505 are authorized to approve purchase orders for their respective entities based on role and hierarchy data stored in a user profile 212 associated with the respective user or the entity profile 208 related to the respective entity.

Upon successful verification, in step 526 the hashing module 222 of the processing server 102 may generate a hash value for the purchase order. The hash value may be generated via the application of one or more hashing algorithms to the purchase order or data included therein. For instance, the purchase order itself may be hashed, the signed purchase order may be hashed, a combination of the signed purchase order and signed acknowledgment message may be hashed, only the identification number of the purchase order and a timestamp may be hashed, etc. In step 528, the generation module 220 of the processing server 102 may generate a new data value that includes the hash value, which may then be stored in the digital ledger. In cases where the digital ledger may be a blockchain, storage of the data value in the digital ledger may include generating a data reference value and block reference value, generating a new block header, generating a new block, verifying the new block, and adding the block to the blockchain. The purchase order as approved by both entities may thus be stored in an immutable and auditable format.

Exemplary Method for Entity Claiming in a Services Platform

Figure 6:
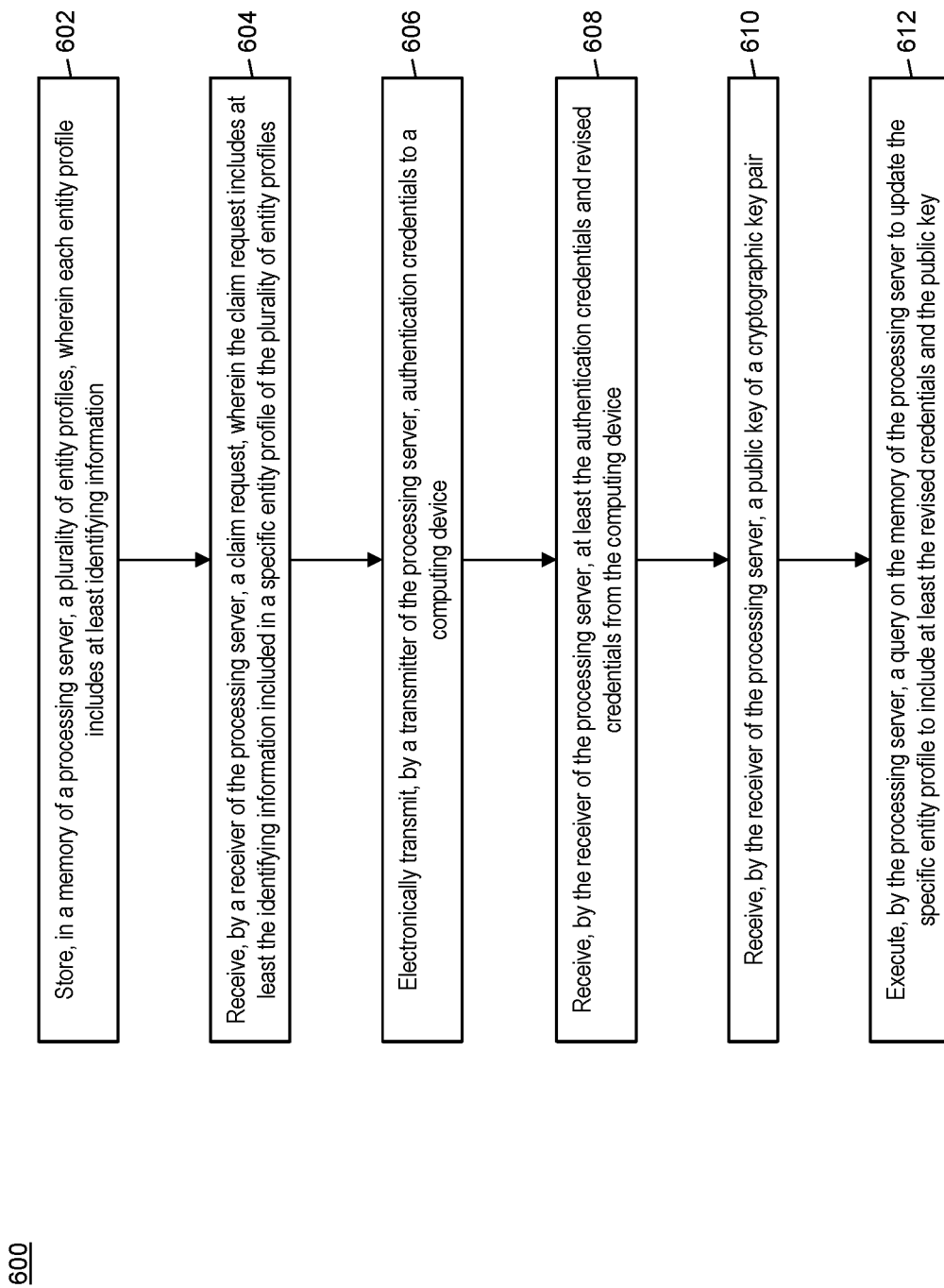
FIG. 6 is a flow chart illustrating an exemplary method for entity claiming in a services platform in accordance with exemplary embodiments.

FIG. 6 illustrates a method 600 for the claiming of an entity that exists in a multi-services platform as well as the registration of the claimed entity.

In step 602, a plurality of entity profiles (e.g., entity profiles 208) may be stored in a memory (e.g., the entity database 206, memory 226, etc.) of a processing server (e.g., the processing server 102), wherein each entity profile includes at least identifying information. In step 604, a claim request may be received by a receiver (e.g., the receiving device 202) of the processing server, wherein the claim request includes at least the identifying information included in a specific entity profile of the plurality of entity profiles. In step 606, authentication credentials may be electronically transmitted by a transmitter (e.g., the transmitting device 224) of the processing server to a computing device (e.g., entity administrator 108).

In step 608, at least the authentication credentials and revised credentials may be received by the receiver of the processing server from the computing device. In step 610, a public key of a cryptographic key pair may be received by the receiver of the processing server. In step 612, a query may be executed on the memory of the processing server to update the specific entity profile to include at least the revised credentials and the public key.

In one embodiment, the public key may be received from the computing device. In another embodiment, the cryptographic key pair may be generated by the processing server. In some embodiments, the method 600 may also include electronically transmitting, by the transmitter of the processing server, a private key of the cryptographic key pair to the computing device. In one embodiment, receiving the authentication credentials and revised credentials may further include receiving a unique identifier for the specific entity profile, and updating the specific entity profile may further include inserting the unique identifier into the specific entity profile.

In some embodiments, the method 600 may further include: generating, by the processing server, a hash value for the specific entity profile; and storing, in the memory of the processing server, the generated hash value. In a further embodiment, the hash value may be generated via the application of one or more hashing algorithms to the identifying information. In another further embodiment, the hash value may be generated via the application of one or more hashing algorithms to the updated specific entity profile.

Exemplary Method for Account Management in a Services Platform

Figure 7:
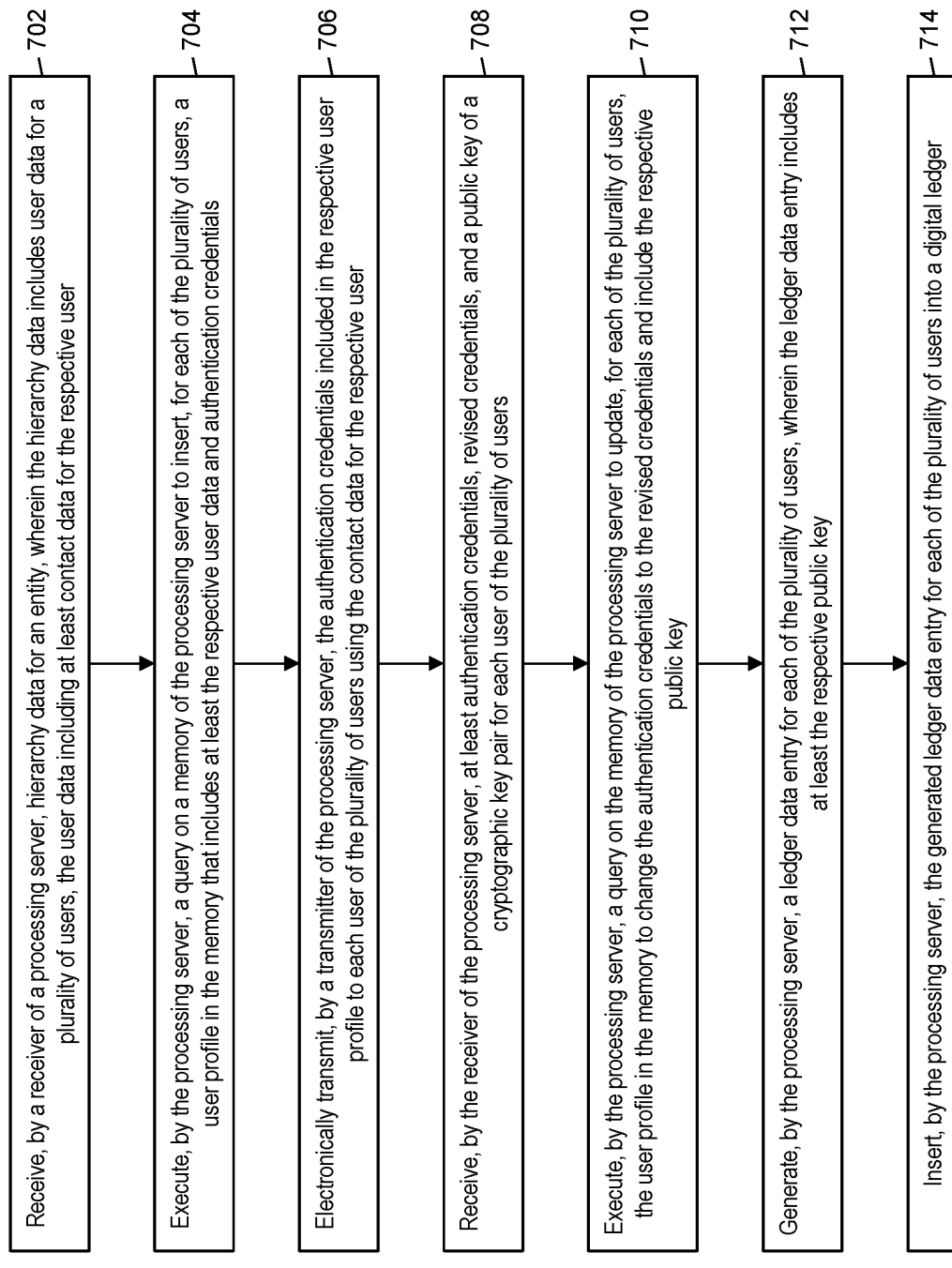
FIG. 7 is a flow chart illustrating an exemplary method for account management in a services platform in accordance with exemplary embodiments.

FIG. 7 illustrates a method 700 for the management of a user hierarchy for an entity in a multi-services platform including the secured storage of user hierarchy data in a digital ledger.

In step 702, hierarchy data for an entity may be received by a receiver (e.g., the receiving device 202) of a processing server (e.g., the processing server 102), wherein the hierarchy data includes user data for a plurality of users, the user data including at least contact data for the respective user. In step 704, a query may be executed on a memory (e.g., the user database 210, memory 226, etc.) of the processing server to insert, for each of the plurality of users, a user profile (e.g., user profile 212) in the memory that includes at least the respective user data and authentication credentials. In step 706, the authentication credentials included in the respective user profile may be electronically transmitted by a transmitter (e.g., the transmitting device 224) of the processing server to each user of the plurality of users using the contact data for the respective user.

In step 708, at least authentication credentials, revised credentials, and a public key of a cryptographic key pair may be received by the receiver of the processing server for each user of the plurality of users. In step 710, a query may be executed by the processing server on the memory of the processing server to update, for each of the plurality of users, the user profile in the memory to change the authentication credentials to the revised credentials and include the respective public key. In step 712, a ledger data entry may be generated by the processing server for each of the plurality of users, wherein the ledger data entry includes at least the respective public key. In step 714, the generated ledger data entry may be inserted into a digital ledger for each of the plurality of users.

In one embodiment, the method 700 may further include storing, in the memory of the processing server, an entity profile related to an entity, wherein the entity profile includes at least an entity identifier and a public key associated with the related entity, and the hierarchy data further includes the entity identifier. In a further embodiment, the user profile for each of the plurality of users may be stored in the entity profile. In some embodiments, the user data may further include a user role, and each ledger data entry may include the user role for the respective user.

In one embodiment, receiving the public key of a cryptographic key pair for each user of the plurality of users may include generating, by the processing server, the cryptographic key pair including the public key and a private key for each of the plurality of users. In a further embodiment, the method 700 may further include electronically transmitting, by the transmitter of the processing server, the private key to the respective user to each of the plurality of users using the contact data for the respective user. In some embodiments, the digital ledger may be a blockchain. In a further embodiment, each ledger data entry may further include a digital signature generated using a private key of the cryptographic key pair of the respective user.

Exemplary Method for Registering Purchase Order Procurement Status

Figure 8:
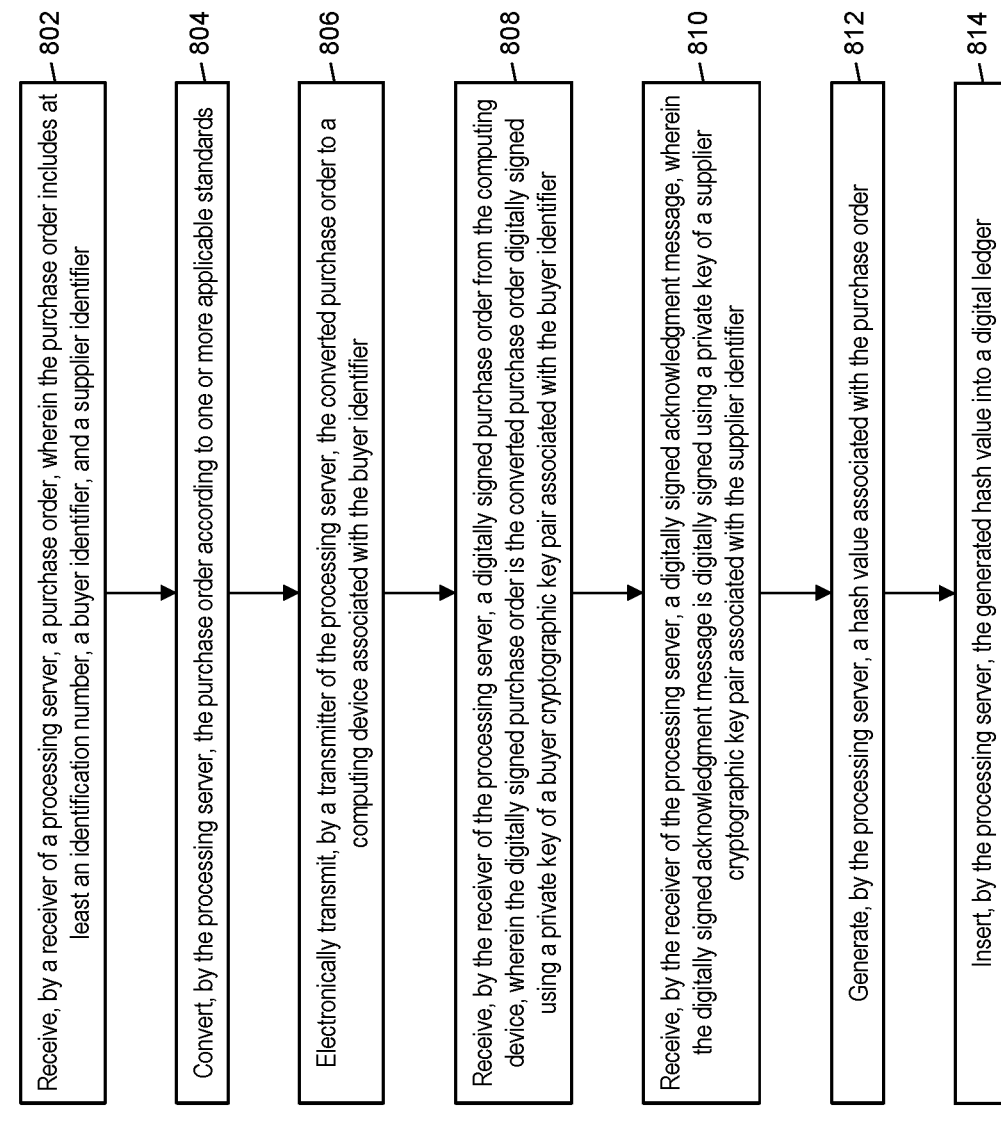
FIG. 8 is a flow chart illustrating an exemplary method for registering purchase order procurement status in accordance with exemplary embodiments.

FIG. 8 illustrates a method 800 for the registration of procurement status for purchase orders in a digital ledger that provides auditability and immutability of purchase order approval and status.

In step 802, a purchase order may be received by a receiver (e.g., the receiving device 202) of the processing server, wherein the purchase order includes at least an identification number, a buyer identifier, and a supplier identifier. In step 804, the purchase order may be converted by the processing server according to one or more applicable standards. In step 806, a transmitter (e.g., the transmitting device 224) of the processing server may electronically transmit the converted purchase order to a computing device (e.g., entity user 112) associated with the buyer identifier. In step 808, a digitally signed purchase order may be received by the receiver of the processing server from the computing device, wherein the digitally signed purchase order is the converted purchase order digitally signed using a private key of a buyer cryptographic key pair associated with the buyer identifier.

In step 810, a digitally signed acknowledgment message may be received by the receiver of the processing server, wherein the digitally signed acknowledgment message is digitally signed using a private key of a supplier cryptographic key pair associated with the supplier identifier. In step 812, a hash value associated with the purchase order may be generated by the processing server. In step 814, the generated hash value may be inserted into a digital ledger by the processing server.

In one embodiment, the method 800 may further include verifying, by the processing server, a digital signature of the digitally signed purchase order using a public key of the buyer cryptographic key pair. In some embodiments, the method 800 may also include verifying, by the processing server, a digital signature of the digitally signed acknowledgment message using a public key of the supplier cryptographic key pair. In one embodiment, the hash value may be generated via application of one or more hashing algorithms to at least the identification number and a timestamp. In some embodiments, the hash value may be generated via application of one or more hashing algorithms to at least the converted purchase order.

In one embodiment, the digital ledger may be a blockchain. In a further embodiment, a digital signature of the digitally signed purchase order may be inserted into the digital ledger with the generated hash value. In another further embodiment, a digital signature of the digitally signed acknowledgment message may be inserted into the digital ledger with the generated hash value.

Computer System Architecture

Figure 9:
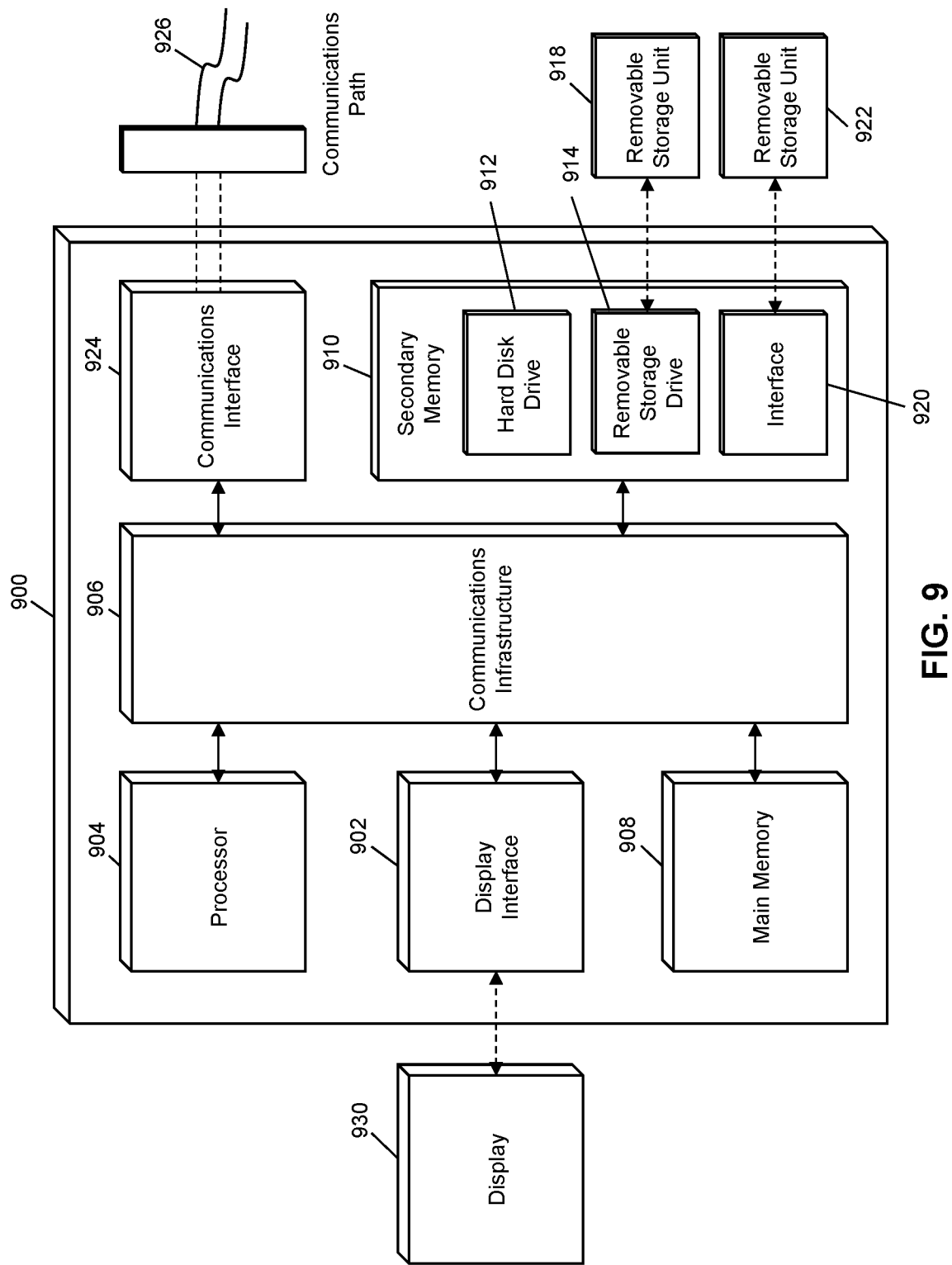
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the processing server 102 of FIG. 1 may be implemented in the computer system 900 using hardware, software, firmware, non-transitory computer readable media having instructions stored thereon, or a combination thereof and may be implemented in one or more computer systems or other processing systems.

Hardware, software, or any combination thereof may embody modules and components used to implement the methods of FIGS. 3-8.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3-8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for entity claiming and account management in a services platform and the registration of purchase order procurement status. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for account management in a services platform, comprising:
   receiving, by a receiver of a processing server, hierarchy data for an entity, wherein the hierarchy data includes user data for each of a plurality of users, the user data including at least contact data for a respective user;
   executing, by the processing server, a query on a memory of the processing server to insert, for the respective user, a user profile in the memory that includes at least the respective user data and authentication credentials;
   electronically transmitting, by a transmitter of the processing server, the authentication credentials included in the respective user profile to one or more users the respective user;
   receiving, by the receiver of the processing server, at least authentication credentials, revised credentials, and a public key of a cryptographic key pair for the respective user;
   executing, by the processing server, a query on the memory of the processing server to update, the respective user profile in the memory to change the authentication credentials to the revised credentials and include the respective public key;
   generating, by the processing server, a ledger data entry for the respective user, wherein the ledger data entry includes at least the respective public key; and
   inserting, by the processing server, the generated ledger data entry for the respective user into a digital ledger.

2. The method of claim 1, further comprising:
   storing, in the memory of the processing server, an entity profile related to an entity, wherein
   the entity profile includes at least an entity identifier and a public key associated with the related entity, and
   the hierarchy data further includes the entity identifier.

3. The method of claim 2, wherein the user profile for the respective user is stored in the entity profile.

4. The method of claim 1, wherein
   the user data further includes a user role, and
   each ledger data entry includes the user role for the respective user.

5. The method of claim 1, wherein receiving the public key of a cryptographic key pair for the respective user includes generating, by the processing server, the cryptographic key pair including the public key and a private key for the respective user.

6. The method of claim 5, further comprising:
   electronically transmitting, by the transmitter of the processing server, the private key to the respective user using the contact data for the respective user.

7. The method of claim 1, wherein the digital ledger is a blockchain.

8. The method of claim 7, wherein each ledger data entry further includes a digital signature generated using a private key of the cryptographic key pair of the respective user.

9. A system for account management in a services platform, comprising:
   a receiver of a processing server configured to receive hierarchy data for an entity, wherein the hierarchy data includes user data for a plurality of users, the user data including at least contact data for a respective user;
   the processing server configured to execute a query on a memory of the processing server to insert, for the respective user, a user profile in the memory that includes at least the respective user data and authentication credentials; and
   a transmitter of the processing server configured to electronically transmit the authentication credentials included in the respective user profile one or more users using the contact data for the respective user, wherein
   the receiver of the processing server is further configured to receive at least authentication credentials, revised credentials, and a public key of a cryptographic key pair for the respective user, and
   the processing server is further configured to
      execute a query on the memory of the processing server to update, for the respective user, the user profile in the memory to change the authentication credentials to the revised credentials and include the respective public key,
      generate a ledger data entry for the respective user, wherein the ledger data entry includes at least the respective public key, and
      insert the generated ledger data entry for the respective user into a digital ledger.

10. The system of claim 9, further comprising:
    the memory of the processing server configured to store an entity profile related to an entity, wherein
    the entity profile includes at least an entity identifier and a public key associated with the related entity, and
    the hierarchy data further includes the entity identifier.

11. The system of claim 10, wherein the user profile for the respective user is stored in the entity profile.

12. The system of claim 9, wherein
    the user data further includes a user role, and
    each ledger data entry includes the user role for the respective user.

13. The system of claim 9, wherein receiving the public key of a cryptographic key pair for the respective user includes generating, by the processing server, the cryptographic key pair including the public key and a private key for the respective user.

14. The system of claim 13, wherein the transmitter of the processing server is further configured to electronically transmit the private key to the respective user to each of the plurality of users using the contact data for the respective user.

15. The system of claim 9, wherein the digital ledger is a blockchain.

16. The system of claim 15, wherein each ledger data entry further includes a digital signature generated using a private key of the cryptographic key pair of the respective user.

* * * * *